(12) United States Patent
Page et al.

(10) Patent No.: US 6,443,403 B1
(45) Date of Patent: Sep. 3, 2002

(54) CABLE ROUTING CLAMP AND METHOD OF APPLICATION

(75) Inventors: Barry O. Page, Woodstock; Kevin L. Nelson; Victor D. Potter, both of Cumming, all of GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/659,660

(22) Filed: Sep. 11, 2000

(51) Int. Cl.[7] ................................................. F16B 15/00
(52) U.S. Cl. ....................... 248/71; 24/16 PB; 248/68.1; 248/74.3
(58) Field of Search .................. 248/71, 74.1, 74.2, 248/74.3, 73, 68.1; 24/16 PB

(56) References Cited

U.S. PATENT DOCUMENTS

| | | | |
|---|---|---|---|
| 2,338,659 A | 1/1944 | Morehouse | |
| 2,338,754 A | 1/1944 | Bonas | |
| 2,399,183 A | * 4/1946 | Harrison | 248/74.3 X |
| 2,416,063 A | * 2/1947 | Nicholls | 248/74.3 X |
| 2,790,614 A | * 4/1957 | Miller | 248/74.3 |
| 2,995,328 A | 8/1961 | Whitted | |
| 3,144,695 A | 8/1964 | Budwig | |
| 3,169,004 A | 2/1965 | Rapata | |
| 3,269,680 A | 8/1966 | Bryant | 248/73 |
| 3,595,506 A | 7/1971 | Saunders | 248/71 |
| 3,758,060 A | 9/1973 | Schuplin | 24/16 PB |
| 4,441,233 A | 4/1984 | Swift | 24/16 PB |
| 4,490,886 A | 1/1985 | Omata | 24/16 PB |
| 4,561,153 A | 12/1985 | Matsui | 24/16 PB |
| 4,570,303 A | 2/1986 | Richmond et al. | 24/16 PB |
| 4,588,218 A | 5/1986 | Guiler et al. | 24/16 PB |
| 4,614,373 A | 9/1986 | Niemeijer | |
| 4,705,245 A | 11/1987 | Osada | 248/73 |
| 4,944,475 A | 7/1990 | Ono et al. | 248/71 |
| 5,131,613 A | 7/1992 | Kamiya et al. | 248/74.3 |
| 5,524,463 A | 6/1996 | Schenkel et al | 24/16 PB |
| 5,669,590 A | * 9/1997 | Przewodek | 248/68.1 |
| 5,713,542 A | * 2/1998 | Benoit | 248/71 |
| 5,816,543 A | 10/1998 | Kraus | 248/73 |

* cited by examiner

*Primary Examiner*—Ramon O. Ramirez
(74) *Attorney, Agent, or Firm*—Robert A. McCann; Jay A. Saltzman; Christopher S. Clancy

(57) ABSTRACT

A routing clamp for routing a bundle of elongated members along a mounting surface having an aperture therein. The clamp includes a bundling portion for bundling the elongated members, the bundling portion having a first end and a second end, a first receiving portion extending from the first end of the bundling portion, the first receiving portion including a first receiving aperture therethrough, a second receiving portion extending from the second end of the bundling portion, the second receiving portion including a second receiving aperture therethrough alignable with the first receiving aperture, a rivet portion extending generally perpendicularly from the second receiving portion, the rivet portion being configured to be received in the mounting surface aperture and retained therein such that the second receiving portion is generally flush with the mounting surface, the rivet portion including a rivet aperture aligned with the second receiving aperture, and a retention portion including a resiliently deformable resistance member, the clamp being mountable along the mounting surface by inserting the retention portion through the alignable first, second and rivet apertures, the deformable resistance member compressibly deforming as it travels through the apertures before resiliently expanding upon exiting the rivet aperture.

19 Claims, 5 Drawing Sheets

CABLE ROUTING CLAMP AND METHOD OF APPLICATION

BACKGROUND OF THE INVENTION

There are a wide variety of fasteners and mounts in use today to secure a bundle of cables or other generally elongated members to a mounting surface, such as a wall or a panel. As it is not uncommon that one installing such mounts has access to only one side of the mounting surface, it is preferable to employ a mount that can be completely installed from the accessible side of the mounting surface, such as by insertion into a preformed or predrilled hole therein. Because such mounts are typically loaded on only one side of the mounting surface, and since bundles of cables may be heavy or subjected to pulling forces, it is important that the mounting be sufficiently strong to resist tear-away stresses induced in this manner. Specifically, if unilateral stresses exceed acceptable levels for a particular clamp, the mounting can become stripped, resulting in cables falling or swinging into undesired positions and creating potentially hazardous conditions.

"P-clamp" type routing clamps are known in the industry, and an example of such clamps is shown in U.S. Pat. No. 3,758,060. Generally, such clamps include a strap or other retaining means for bundling cables or other elongated members, a support piece at one end of the strap for being inserted into a preformed or predrilled hole in the mounting surface, and an insert piece at the opposite end of the strap for being inserted into and being retained in the support piece. Typically, there is some sort of retention mechanism, such as a barb, on the insert piece to retain it within the support piece once the support piece has been adequately penetrated. In bringing together opposite ends of the strap in this manner, a loop is formed by the strap, and the loop is used to retain and bundle the cables. The loop combines with other clamp structure to form a "P" shape.

Among the important considerations in P-clamp design are the resistance of the mount to tear-away stripping under various loading or stress conditions, the cost of manufacture, and the ease of application of the mount. In particular, many past designs have inadequately protected against mount stripping under heavy loading conditions. As such, a need has arisen for designing a clamp with a stronger mount while avoiding the complexity of application and cost of manufacture associated with having multiple piece mounting mechanisms.

SUMMARY OF THE INVENTION

To address the above-mentioned considerations and shortcomings in previous P-clamp designs, there is provided a new routing clamp for routing a bundle of cables or the like along a mounting surface having an aperture therein. The instant clamp includes a bundling portion for bundling the cables, a first receiving portion including a first receiving aperture therethrough, and a second receiving portion including a second receiving aperture therethrough. The first and second receiving portions are alignable. The clamp further includes a rivet portion configured to be received in the mounting surface aperture and retained therein such that the second receiving portion is generally flush with the mounting surface. The rivet portion includes a rivet aperture aligned with the second receiving aperture. Additionally, the clamp includes a retention portion having a resiliently deformable resistance member. The clamp is mountable along the mounting surface by inserting part of the resistance member through the alignable first, second and rivet apertures, the deformable resistance member compressibly deforming as it travels through the apertures before resiliently expanding upon exiting the rivet aperture. With this structure, the new routing clamp has improved resistance to mount stripping while being inexpensive to manufacture and easy to apply in most situations.

DETAILED DESCRIPTION OF PREFERRED EMBODIMENTS

The instant invention is directed generally to clamps for routing a bundle of cables or the like, and more particularly to a P-clamp with a push rivet having improved tear-away resistance.

Figure 1:
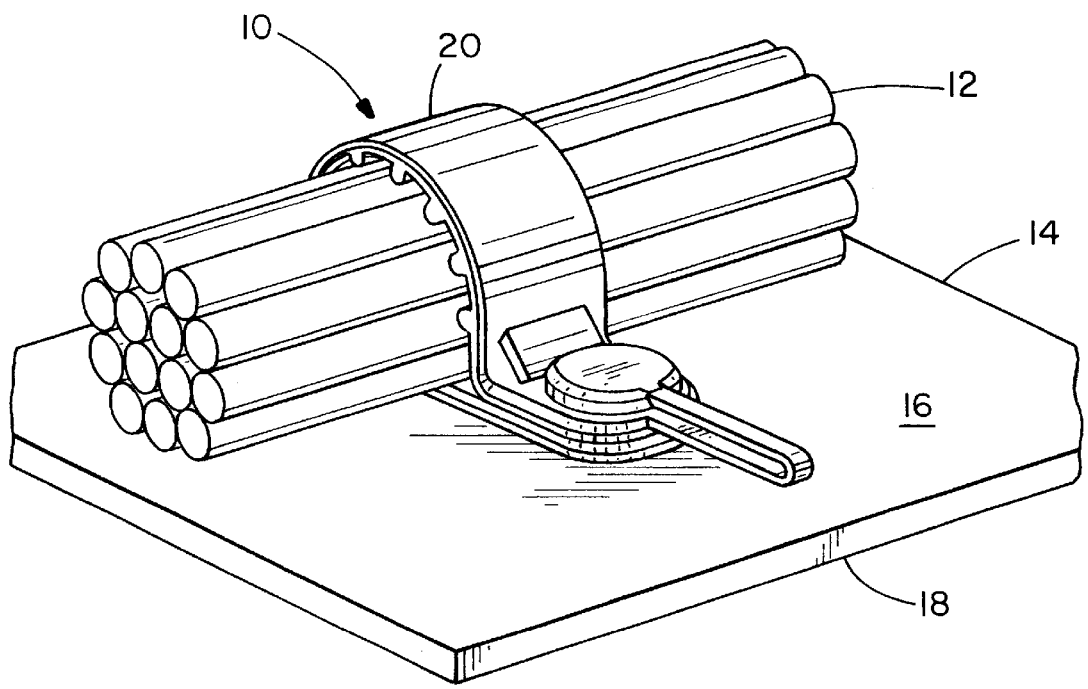
FIG. 1 is a perspective view of a cable routing clamp in accordance with an embodiment of the invention in a fully installed state.
Figure 2:
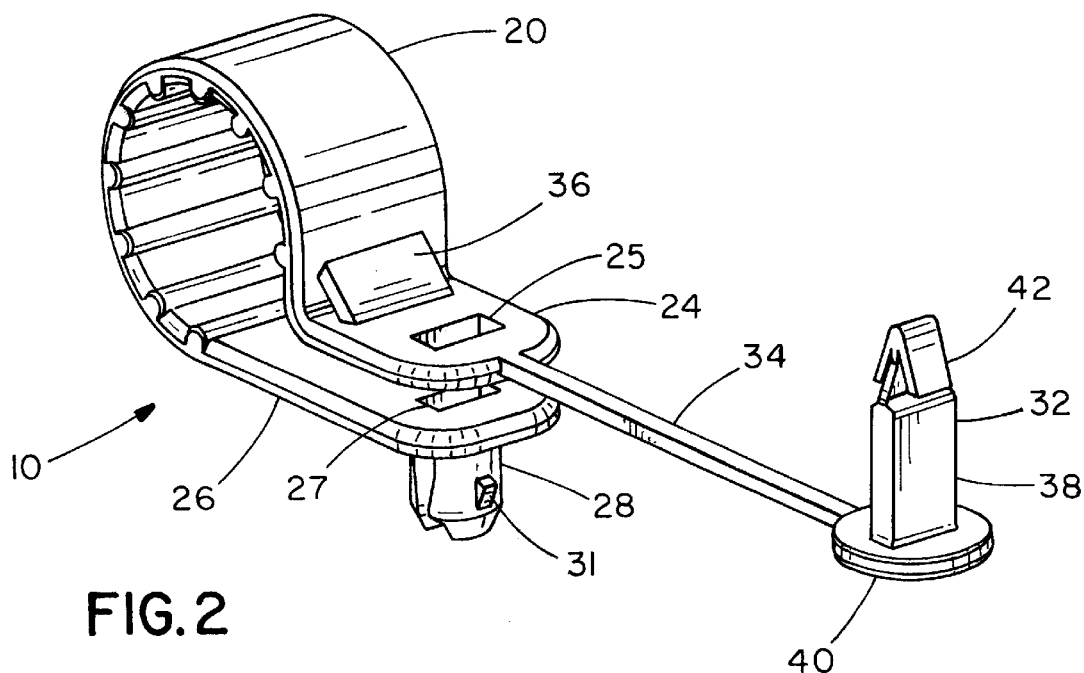
FIG. 2 is a perspective view of the clamp of FIG. 1 in an uninstalled state.
Figure 3:
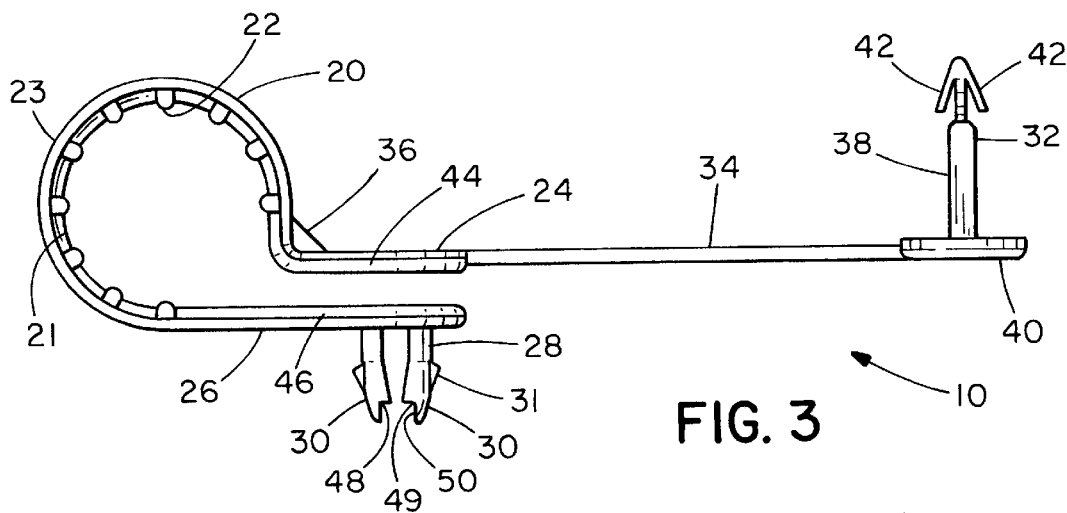
FIG. 3 is a front view of the clamp of FIG. 1.
Figure 4:
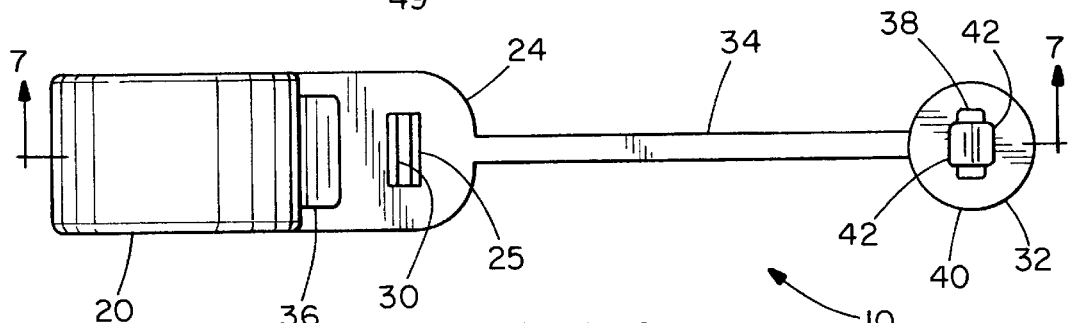
FIG. 4 is a top plan view of the clamp of FIG. 1.
Figure 5:
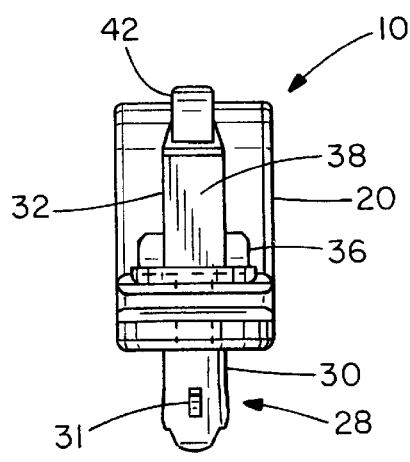
FIG. 5 is a right side view of the clamp of FIG. 1.
Figure 6:
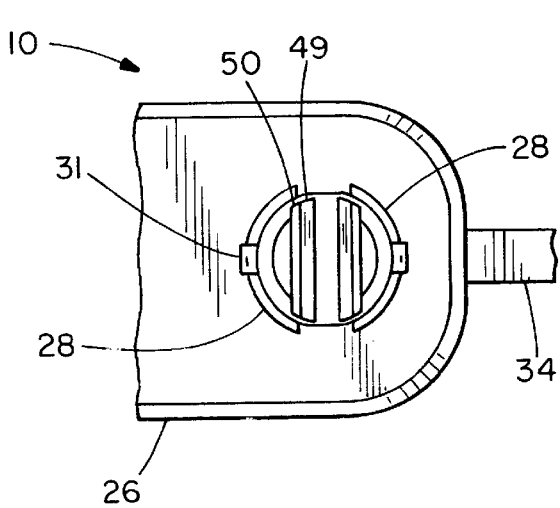
FIG. 6 is a broken bottom plan view of a rivet portion and second receiving portion of the clamp of FIG. 1 in an uninstalled state.
Figure 7:
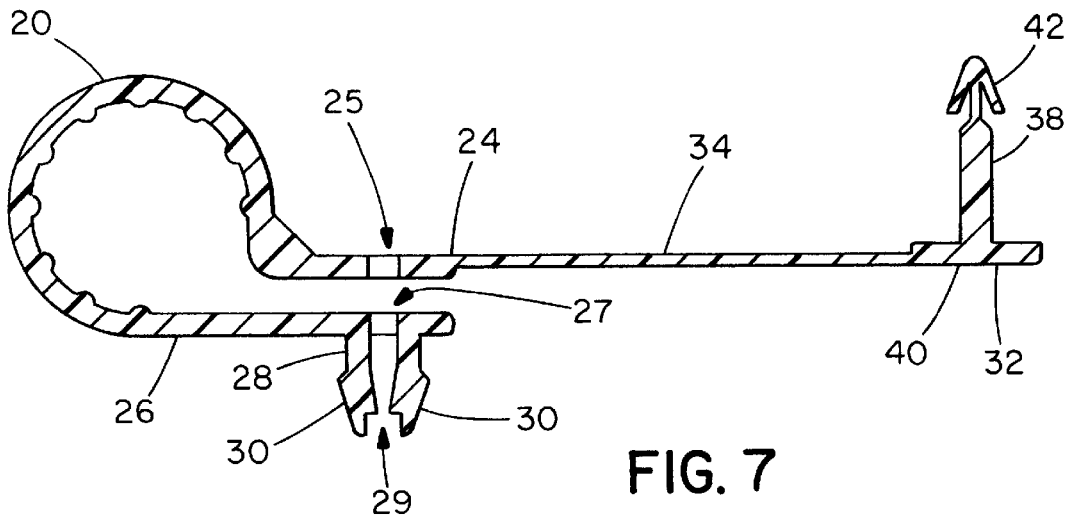
FIG. 7 is a cross-sectional view of the clamp of FIG. 1 taken along the line 7—7 shown in FIG. 3.

Shown in perspective in FIGS. 1 and 2, an embodiment of the inventive cable routing clamp 10 is presented in a completely uninstalled state in FIG. 2 and a completely installed state in FIG. 1. As seen in FIG. 1, the clamp 10 retains and bundles a plurality of cables 12, or any primarily longitudinal elements, and mounts the bundled cables to a mounting surface 14, such as a wall or panel. As the mounting surface may not always be accessible from both of its sides, the accessible side 16 is the installation side while the rear surface 18 of the mounting surface need not be directly accessed by the clamp installer. An aperture 15 is preferably preformed or drilled in the mounting surface 14 so that the clamp may be retained therein. The clamp 10 generally includes a bundling portion 20, first and second receiving portions 24 and 26, a rivet portion 28, and a retention portion 32, and the clamp 10 is described in detail below.

As seen in FIG. 2, and in more detail in FIGS. 3–7, the clamp 10 includes a flexible bundling portion 20, such as a strap, preferably having a number of transversely oriented ribs 22 along its inner surface 21 for providing torsional strength to the strap and facilitating the maintenance of relative position among the cables bundled therein. At opposite ends of the bundling portion 20 are a first receiving portion 24 having a first receiving aperture 25 and a second receiving portion 26 having a second receiving aperture 27. The receiving apertures 25 and 27 are shown to have a rectangular cross section in the illustrated embodiment, but may, in alternative embodiments, be of circular or other cross-sectional shape. The receiving portions are preferably flat, but regardless of flatness, the inner surface 44 of the first receiving portion 24 should come generally flush with the inner surface 46 of the second receiving portion 26 when the clamp 10 is in a fully installed state, at least over some portion of the respective surfaces. An angle support 36 may preferably be included to heighten the integrity of the bundle and to inhibit tear-away pressure on an installed clamp.

Extending generally perpendicularly from the second receiving portion 26 is a rivet portion 28. In the illustrated embodiment, the rivet portion 28 includes opposing rivet projections 30. The rivet projections are independently resiliently deformable and may include one or more rivet barbs 31 on their respective peripheries for providing tear-away resistance once the clamp 10 is mounted. Though not illustrated, the rivet portion could alternatively take a single generally annular deformable form, for example, rather than having multiple, independently deformable component projections. Also, as described below, an embodiment of the invention may include a different type of rivet portion, such as one having a shoulder providing tear-away resistance. The rivet portion 28 includes a rivet aperture 29 generally centrally disposed therethrough. The aperture may be tubular, as in the case of the annular embodiment, or may be open, as in the illustrated rivet portion 28 or any embodiment having independently deformable component projections. The rivet portion 28 includes recesses 48 near the remote end thereof for interacting with the retention portion 32 during installation and/or application. Each recess 48, in the embodiment shown in FIGS. 1–12, preferably has a deforming recess edge 49 and a constraining recess edge 50.

As further seen in FIG. 2, extending from the first receiving portion 24 is an elongate portion 34 having a retention portion 32 at the remote end thereof. In the illustrated embodiment, the retention portion includes a stem 38 with a backplane 40 on one end of the stem and a resistance member 42, such as a retention barb, at the opposite end of the stem. The illustrated stem is generally of rectangular cross section so that it may pass through the similarly shaped receiving apertures 25 and 27 during installation, but is more generally of suitable cross section to cooperate with whatever cross section the apertures have. The illustrated retention barb 42 includes a pair of oppositely angled deformable wings which can be compressed into closer proximity with the stem 38 or may be oppositely spread apart from the stem. The retention barb alternatively may include individually deformable components or be of any known form. The illustrated backplane 40 is a round generally planar portion generally perpendicular to the axis of the stem 38 for facilitating manual installation of the clamp.

Figure 8:
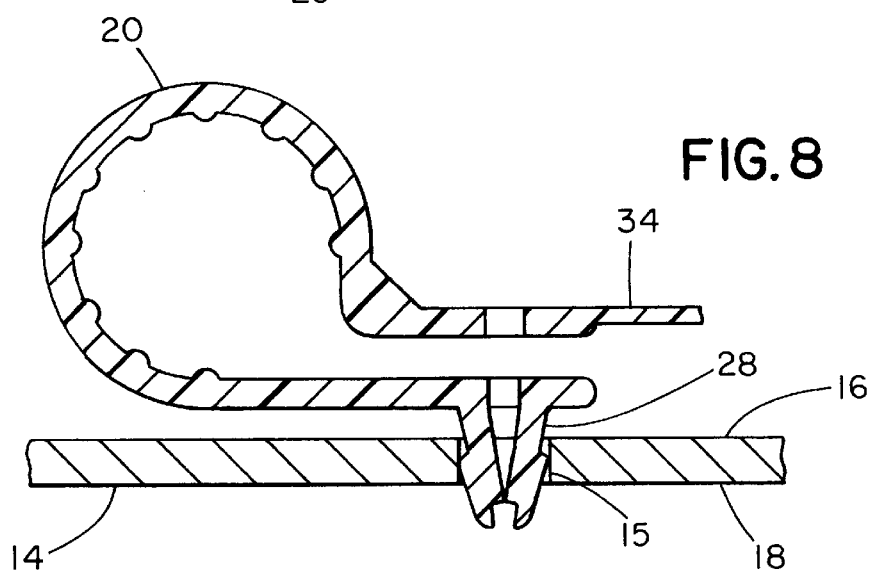
FIG. 8 is a cross-sectional view of the clamp of FIG. 1 akin to FIG. 7 wherein the clamp is broken away at its elongate member and the rivet portion is partially engaged with the mounting surface.

FIGS. 8–11 illustrate the method of mounting the clamp 10 onto the mounting surface 14. As shown in FIG. 8 specifically, the rivet portion 28 is inserted into the aperture 15 in the mounting surface. This insertion requires enough force only to encourage the tapered rivet projections 30 to be deformably compressed into the rivet aperture 29 as the rivet portion 28 travels through the aperture 15. Once the rivet barbs 31 on the periphery of the rivet portion 28 have completely traversed the aperture, the rivet portion and its independently deformable components may resiliently expand into a locked position with the rivet barbs 31 against the rear side 18 of the mounting surface, thereby reopening the rivet aperture 29.

Figure 9:
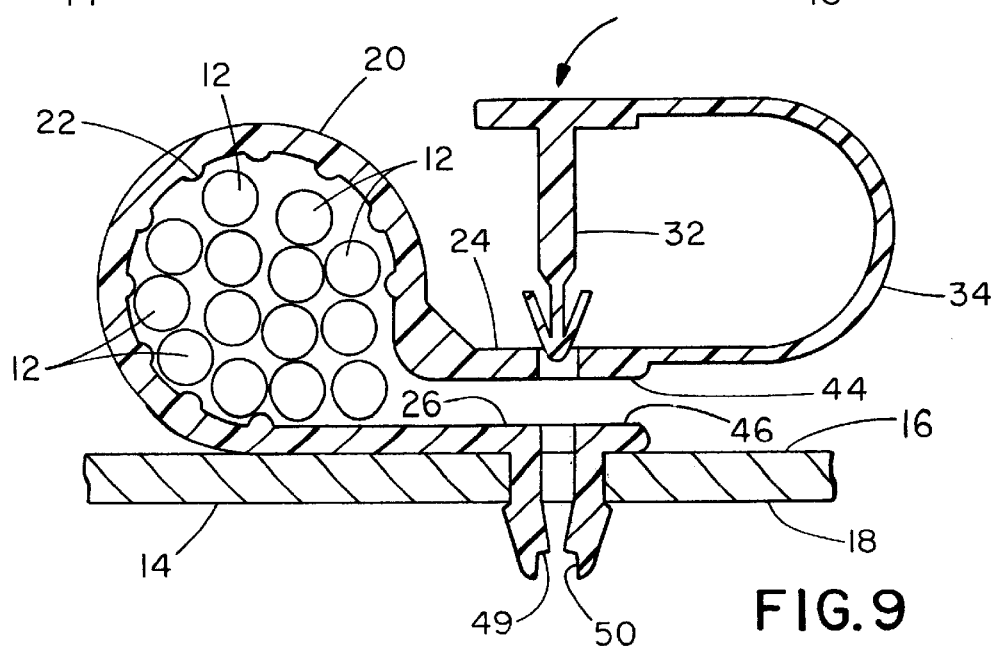
FIG. 9 is a cross-sectional view of the clamp of FIG. 1 akin to FIG. 8 wherein the rivet portion is fully engaged with the mounting surface, the bundling portion is retaining and bundling cables, and the insert portion is beginning engagement with the first receiving aperture.

Progressing to FIG. 9, once the clamp is mounted onto the mounting surface, the cables 12 or other elongated elements are slid between the receiving portions 24 and 26 and into the bundling portion 20. The ribs 22 help maintain the elongated elements in an integral bundle, especially where the surfaces of the elongated elements are not particularly frictional. Once the cables are in place, the installer should pinch together the receiving portions 24 and 26 to obtain a flush fit and to align the receiving apertures 25 and 27. The flush fit will prevent any escaping of the bundling portion by the cables, and the alignment of the receiving apertures 25 and 27 will facilitate the subsequent insertion of the retention portion 32. Once the apertures are aligned, the installer places the head of the retention portion, i.e. the barb 42, at the first receiving aperture 25 by manually pressing the backplane 40 to pivot the retention portion 32 into position with the deformable elongated member 34 bending to accommodate the pivoting.

Figure 10:
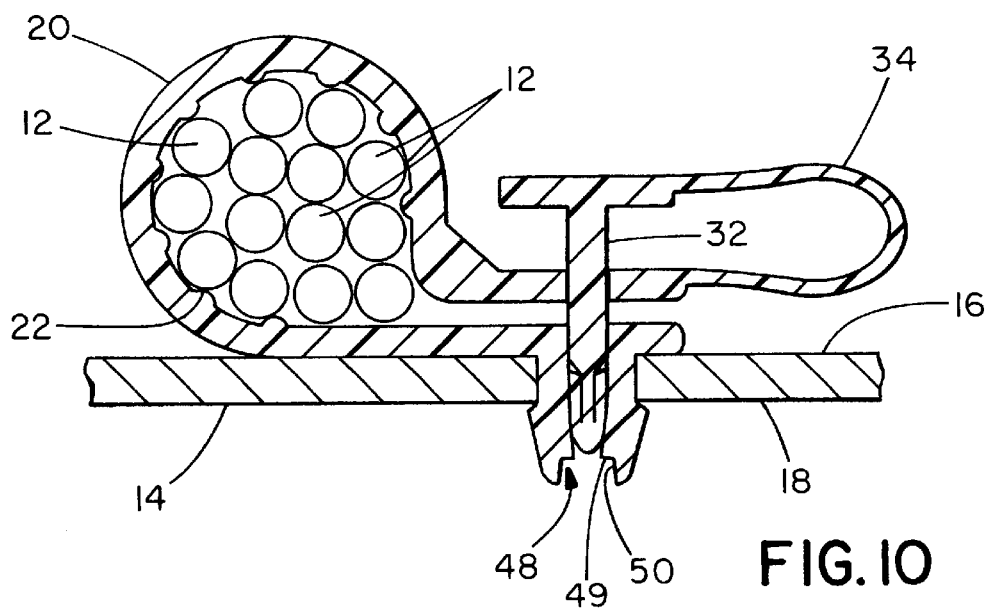
FIG. 10 is a cross-sectional view of the clamp of FIG. 1 akin to FIG. 9 wherein the insert portion is compressibly deformed within the rivet aperture.
Figure 11:
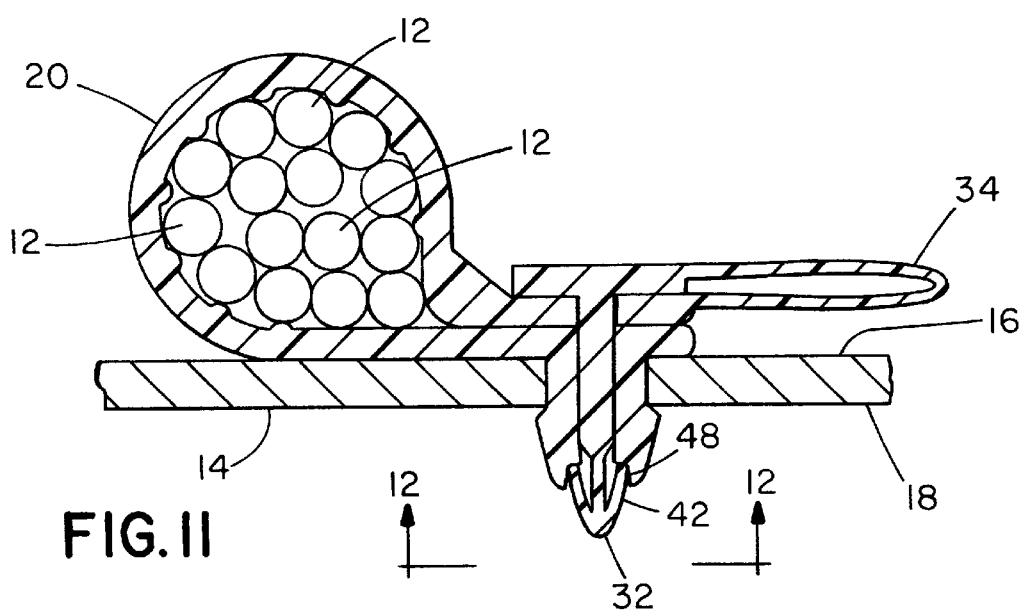
FIG. 11 is a cross-sectional view of the clamp of FIG. 1 akin to FIG. 10 wherein the insert portion is fully engaged and the clamp is an a fully installed state.
Figure 12:
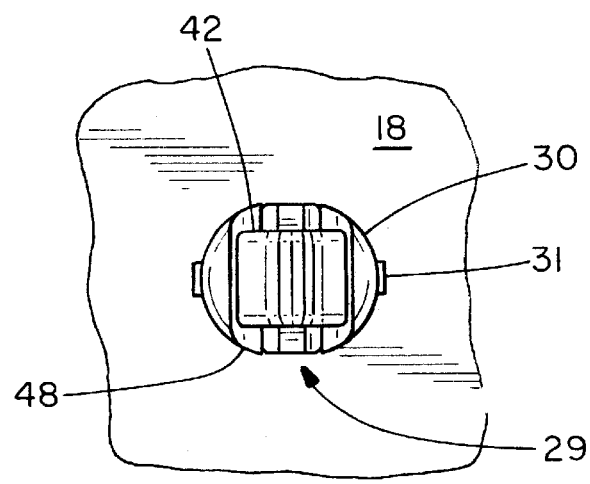
FIG. 12 is a broken bottom plan view of a rivet portion and second receiving portion of the clamp of FIG. 1 in a fully installed state.

Once the retention portion 32 is placed appropriately at the mouth of the aligned apertures 25, 27, and 29, the retention portion is pushed through the apertures, causing the winged retention barb 42 to compressibly deform toward the stem 38. FIG. 10 illustrates this intermediate position of the retention portion 32. Once the remote ends of the winged retention barb 42 reach the deforming edge 49 of the rivet recesses 48, and thereby clear the rivet aperture 29, the wings resiliently expand back toward their natural unstressed angular positions by expanding into the rivet recesses 48. As the wings expand past the extent of the rivet aperture 29, the retention portion is locked into place. The wings are limited in their outward expansion by the edges of the rivet portion 28 defining the recesses 48. This position is shown in FIG. 11 and, from a broken bottom plan view, FIG. 12.

One purpose of the recesses is to provide additional stripping/tear-away resistance to the clamp. Without such recesses in some previous designs, an overloading tear-away force would cause such wings of a retention barb to slide outwardly along the surface of the rivet portion until yielding and/or plastic deformation occurred. In such an instance, the wings would invert such that they could no longer lock the retention portion into the aligned apertures. Thus, the retention portion would pull out of the apertures and subsequently either the cables would escape from the no-longer-cinched bundling portion or the rivet portion, being compressibly deformable without the stem present in the rivet aperture, would be torn back through the mounting surface aperture 15. The recesses of the instant invention significantly strengthen the installed clamp. As seen in FIG. 11, a severe tear-away loading would cause the wings of the retention barb 42 to try to expand radially along the deforming recess edges 49 of the recesses 48. The constraining recess edges 50, however, constrain such undesirable wing expansion by limiting the outward expansion of the remote ends of the wings. Thus, it requires a significantly larger tear-away force to initiate failure of the instant clamp.

Figure 13:
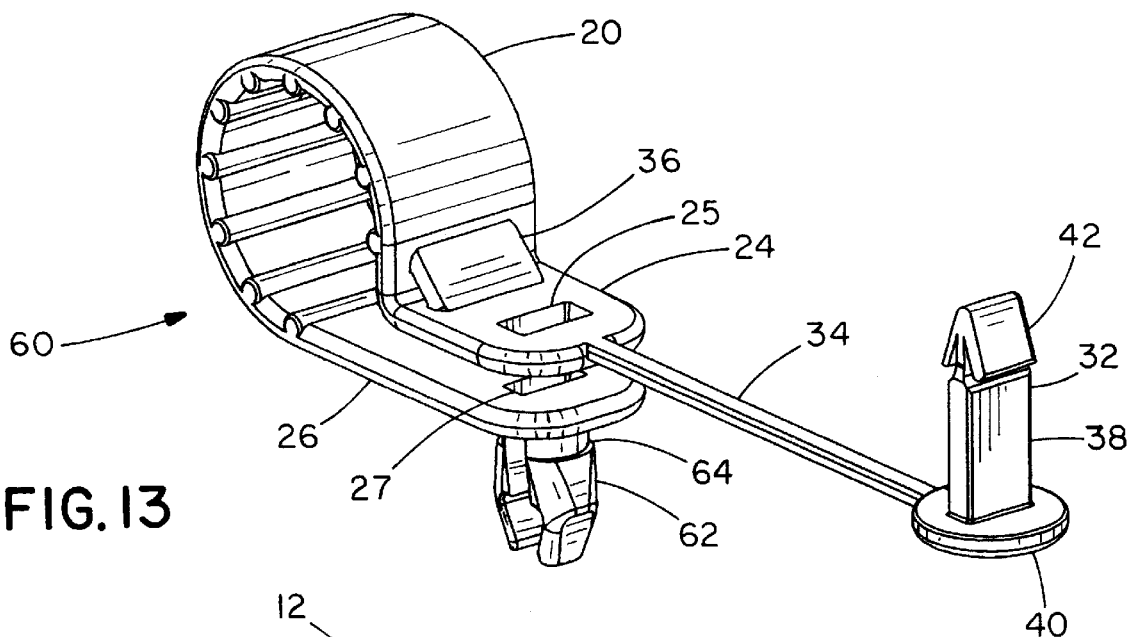
FIG. 13 is a perspective view of a cable routing clamp in accordance with an embodiment of the invention.
Figure 14:
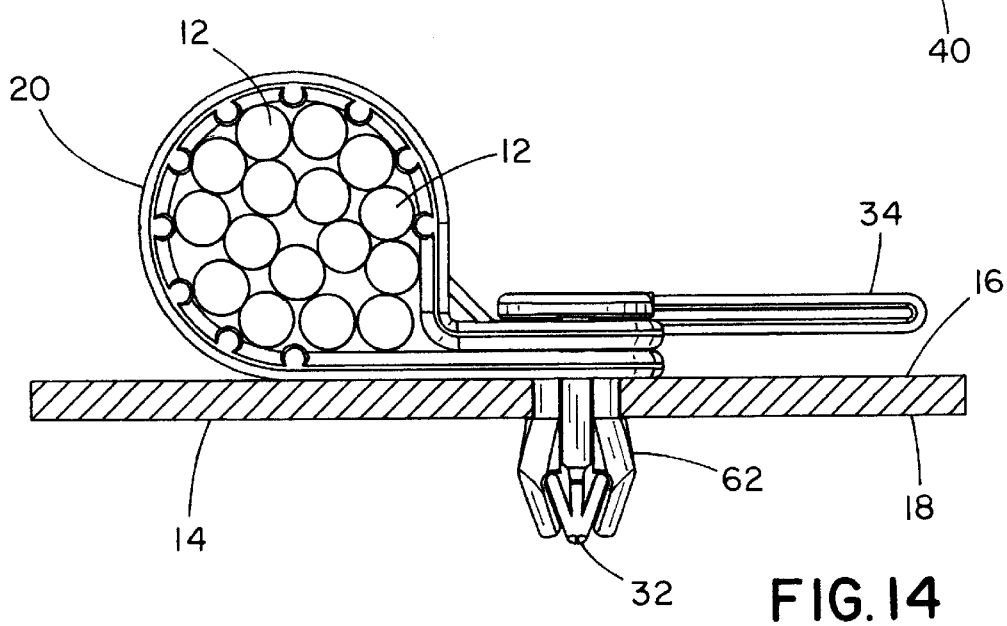
FIG. 14 is a front elevational view of the clamp of FIG. 13 wherein the insert portion is fully engaged and the clamp is in a fully installed state.
Figure 15:
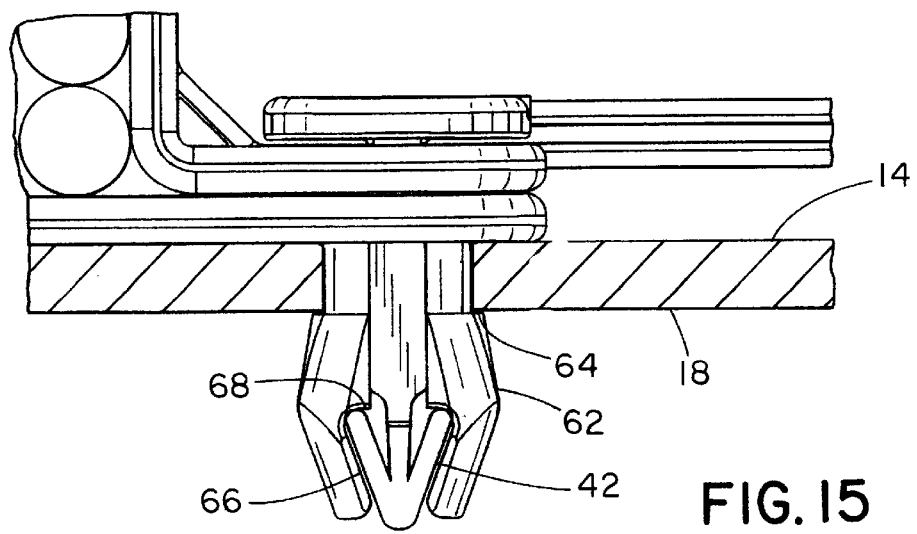
FIG. 15 is a broken front elevational view of the clamp of FIG. 13 showing detail of the insert and rivet structure when the clamp is in a fully installed state.

Another embodiment of the inventive routing clamp is shown in FIGS. 13–15. This embodiment of the clamp 60 has a slightly different rivet portion 62 from the aforedescribed clamp 10. In particular, the rivet portion 62 includes an integral, orthogonal shoulder 64 for abutting the rear surface 18 of the mounting surface 14 after installation and resisting tear-away-forces applied thereto. Also, the recess of rivet portion 62 is defined by straight portion 66 and curved portion 68. Although curved portion 68, like deforming recess edge 49 on the aforedescribed embodiment, receives the retention barb at the end of the resistance member 42, it is not similarly tapered to diverge the barbs when tear-away force is applied. Rather, the straight portions 66 substantially abut the barbs upon installation such that they resist any divergent force applied to the barbs. Thus, in the aforedescribed embodiment, the barbs diverge resiliently until contacting constraining recess edge 50, while in the embodiment of FIGS. 13–15, the barbs are substantially maximally diverged against straight portion 66 immediately after installation.

It should be noted that the above-described and illustrated embodiments of the invention are not an exhaustive listing of the forms a routing clamp in accordance with the invention could take; rather, they serve as exemplary and illustrative of preferred embodiments of the invention as presently understood. Many other forms of the invention are believe to exist. The invention is defined by the following claims.

What is claimed is:

1. A routing clamp for routing a bundle of elongated members along a mounting surface having an aperture therein, said clamp comprising:
   a bundling portion for bundling said elongated members, said bundling portion having a first end and a second end;
   a first receiving portion extending from said first end of said bundling portion, said first receiving portion including a first receiving aperture therethrough;
   a second receiving portion extending from said second end of said bundling portion, said second receiving portion including a second receiving aperture therethrough alignable with said first receiving aperture;
   a rivet portion extending generally perpendicularly from said second receiving portion, said rivet portion being configured to be received in said mounting surface aperture and retained therein such that said second receiving portion is generally flush with said mounting surface, said rivet portion including a rivet aperture aligned with said second receiving aperture; and
   a retention portion including a resiliently deformable resistance member, said clamp being mountable along said mounting surface by inserting said retention portion through said alignable first, second and rivet apertures, said deformable resistance member compressibly deforming as it travels through said apertures before resiliently expanding upon exiting said rivet aperture.

2. A routing clamp in accordance with claim 1 wherein said rivet portion includes a recess therein and said resistance member expands into said rivet recess once beyond said rivet aperture.

3. A routing clamp in accordance with claim 1 wherein said rivet portion includes a shouldered portion for retaining said rivet portion in said mounting surface.

4. A routing clamp in accordance with claim 1 wherein said rivet portion includes a recess into which said resistance member expands when a sufficiently large load is applied to said clamp.

5. A routing clamp in accordance with claim 4 wherein said resistance member has its expansion limited by said recess when a sufficiently large load is applied to said clamp.

6. A routing clamp in accordance with claim 1 wherein rivet recesses limit said resilient expansion of said deformable resistance members.

7. A routing clamp in accordance with claim 1 further comprising a deformable elongate portion extending from said first receiving portion to said retention portion such that said elongate portion is deformed in order to insert said retention portion into said aligned apertures.

8. A routing clamp in accordance with claim 7 wherein said bundling portion, said first receiving portion, said second receiving portion, said rivet portion, said retention portion, and said elongate portion are portions of a single integrally molded clamp.

9. A routing clamp in accordance with claim 1 wherein said retention portion includes a plurality of deformable resistance members, said rivet portion includes a plurality of recesses, and each of said resistance members is correspondingly resiliently expandable into one of said recesses.

10. A routing clamp in accordance with claim 1 wherein said bundling portion, said first receiving portion, said second receiving portion, said rivet portion, and said retention portion are portions of a single integrally molded clamp.

11. A routing clamp in accordance with claim 1 wherein said resiliently deformable resistance member comprises a pair of oppositely angled barbs disposed for one way travel through said aligned apertures.

12. A routing clamp in accordance with claim 1 wherein said retention portion includes a backplane portion for receiving manual pressure to facilitate manual installation of said clamp.

13. A routing clamp in accordance with claim 1 wherein said rivet portion comprises a plurality of rivet projections which are independently resiliently deformable.

14. A routing clamp in accordance with claim 13 wherein each of said rivet projections includes a shouldered portion for retaining said rivet portion in said mounting surface.

15. A routing clamp in accordance with claim 13 wherein each of said rivet projections includes a recess for accommodating the expansion of said retention portion upon exiting said rivet aperture.

16. A routing clamp in accordance with claim 13 wherein each of said rivet projections includes a barb for retaining said rivet portion in said mounting surface aperture.

17. A method for installing a routing clamp for routing at least one elongated member along a mounting surface having an aperture therein, said clamp including a bundling portion for bundling said at least one elongated member, first and second receiving portions having alignable first and second receiving apertures respectively therethrough attached to opposing ends of said bundling portion, a rivet portion extending from said second receiving portion and being configured to be received in said mounting surface aperture, said rivet portion including a rivet aperture aligned with said second receiving aperture, and a retention portion including a resiliently deformable resistance member, said method comprising the following steps:
   inserting said rivet portion of said clamp into said mounting surface aperture to engage said clamp with said mounting surface;

spreading said first and second receiving portions relatively apart to permit the entry of elongated members therebetween;

passing said at least one elongated member between said first and second receiving portions and placing said at least one elongated member against an inner surface of said bundling portion;

aligning said first receiving aperture with said second receiving aperture;

placing said retention portion at said first receiving aperture; and inserting said retention portion through said first, second, and rivet receiving apertures.

18. A method in accordance with claim 17 wherein said rivet portion comprises a plurality of rivet projections which are independently resiliently deformable and said step of inserting said rivet portion into said mounting surface aperture includes deforming at least one of said plurality of rivet projections inwardly relative to a central axis of said mounting surface aperture until said one projection penetrates to a point where it resiliently deforms outwardly to provide resistance to mount stripping of said clamp.

19. A method in accordance with claim 17 wherein said clamp further includes a deformable elongate portion extending from said first receiving portion to said retention portion said step of placing said retention portion at said first receiving aperture includes the bending of said elongate portion.

* * * * *